United States Patent
Füchtner

(10) Patent No.: US 9,045,131 B2
(45) Date of Patent: Jun. 2, 2015

(54) METHOD AND DEVICE FOR CONTROLLING A DRIVE TRAIN OF A HYBRID VEHICLE

(75) Inventor: Martin Füchtner, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 499 days.

(21) Appl. No.: 13/329,543

(22) Filed: Dec. 19, 2011

(65) Prior Publication Data
US 2012/0166028 A1    Jun. 28, 2012

(30) Foreign Application Priority Data
Dec. 22, 2010   (DE) .......................... 10 2010 061 477

(51) Int. Cl.
| | |
|---|---|
| *B60L 11/00* | (2006.01) |
| *B60W 20/00* | (2006.01) |
| *B60L 1/00* | (2006.01) |
| *B60L 3/00* | (2006.01) |

(Continued)

(52) U.S. Cl.
CPC .......... *B60W 20/00* (2013.01); *B60K 2001/006* (2013.01); *B60L 1/003* (2013.01); *B60L 3/0046* (2013.01); *B60L 3/0061* (2013.01); *B60L 11/14* (2013.01); *B60L 2240/36* (2013.01); *B60L 2240/425* (2013.01); *B60L 2240/545* (2013.01); *B60W 10/30* (2013.01); *Y02T 10/7258* (2013.01); *Y02T 10/7077* (2013.01); *Y02T 10/642* (2013.01); *Y02T 10/70* (2013.01)

(58) Field of Classification Search
USPC .............. 701/22, 69, 70, 83, 84, 99, 100, 101
See application file for complete search history.

(56) References Cited

U.S. PATENT DOCUMENTS

| | | |
|---|---|---|
| 2002/0043413 A1 | 4/2002 | Kimishima et al. |
| 2009/0143929 A1* | 6/2009 | Eberhard et al. ................ 701/22 |

(Continued)

FOREIGN PATENT DOCUMENTS

| | | |
|---|---|---|
| DE | 9422162 U1 | 7/1998 |
| DE | 69502207 T2 | 10/1998 |

(Continued)

OTHER PUBLICATIONS

Japanese Office Action corresponding to counterpart Japanese Patent Application No. 2011-273249, dated Oct. 22, 2013.

(Continued)

*Primary Examiner* — Kim T Nguyen
(74) *Attorney, Agent, or Firm* — RatnerPrestia

(57) ABSTRACT

A method and a device for controlling a drive train of a hybrid vehicle (HEF), which can be driven by an internal combustion engine (BKA), respectively individually or together with an electric machine (EA), which includes an electrical energy store (ES), power electronics (LE) and a motor/generator unit (MGE). Depending on a first or second position of an operator control (BV), the drive train (A) is operated in a first operating mode (BM1) corresponding to a boost preparatory phase or in a second operating mode (BM2) corresponding to a boost phase. In the first operating mode (BM1) the electrical energy store (ES) is charged by operating the motor/generator unit (MGE), as a generator, and in the second operating mode (BM2) a boost function of the electric machine (EA) is called by operating the motor/generator unit (MGE), together with the internal combustion engine (BKA), as a motor.

16 Claims, 3 Drawing Sheets

(51) Int. Cl.
B60L 11/14 (2006.01)
B60W 10/30 (2006.01)
B60K 1/00 (2006.01)

(56) References Cited

U.S. PATENT DOCUMENTS

2009/0171523 A1* 7/2009 Luo et al. .................. 701/22
2011/0190981 A1 8/2011 Niwa et al.

FOREIGN PATENT DOCUMENTS

| DE | 102008024234 | A1 | 12/2008 |
|----|--------------|----|---------|
| EP | 1810861 | A1 | 7/2007 |
| EP | 2055563 | A2 | 5/2009 |
| JP | 2002-191104 | | 7/2002 |
| JP | 2009-184647 | | 8/2009 |
| JP | 2011189889 | A | 9/2011 |
| WO | WO2010/079717 | A1 | 7/2010 |

OTHER PUBLICATIONS

German Search Report mailed Aug. 9, 2011, 5 pgs.

* cited by examiner

METHOD AND DEVICE FOR CONTROLLING A DRIVE TRAIN OF A HYBRID VEHICLE

CROSS-REFERENCE TO RELATED APPLICATION

This U.S. patent application claims priority to German Patent Application DE 102010061477.7, filed Dec. 22, 2010, which is incorporated by reference herein in its entirety.

FIELD OF THE INVENTION

The present invention relates to a method and to a device for controlling an electric drive train of a hybrid vehicle.

BACKGROUND OF THE INVENTION

EP 2 055 563 A2, which is incorporated by reference herein, describes a drive system for making available electrical energy for an electric drive train device, wherein a multiplicity of power factors are arranged between an input element, and an output element which is connected to an electrical energy store. In this context, in the described system where different operating parameters are monitored in order to determine a drive torque of the device and to request an increase in electrical power.

EP 1 810 861 A1, which is incorporated by reference herein, is concerned with controlling a power-branched hybrid system. The device described in said document comprises a vehicle drive system comprising: an alternating current traction drive system, a first energy storage system which is electrically coupled to the traction drive by a direct current connection, a second energy storage system which is electrically coupled to the traction drive in such a way that the voltage which is output by the second energy storage system is isolated from the DC connection of a high voltage side. In addition, the device described in said document comprises a low voltage side having a bidirectional step-up converter and an energy management system which is configured to control the first and second energy storage systems if the vehicle is operating in at least one of a precharge mode and a normal operating mode when the traction drive system is activated, wherein the second energy storage system has a super capacitor and a battery with the highest specific energy level, which super capacitor and battery are each coupled to the low voltage side of the step-up converter. In addition, the device described in said document comprises at least one current sensor and one voltage sensor, wherein the energy management system is configured to receive an output signal from the sensor or sensors.

SUMMARY OF THE INVENTION

The invention is directed to an improved method for controlling a drive train of a hybrid vehicle, as a result of which a boost phase can be prepared in a flexible way.

Disclosed herein is a method for controlling a drive train (A) of a hybrid vehicle (HEF), which can be driven by an internal combustion engine (BKA), respectively individually or together with an electric machine (EA), which comprises an electrical energy store (ES), power electronics (LE) and a motor/generator unit (MGE); wherein, depending on a first or second position of an operator control (BV), the drive train (A) is operated in a first operating mode (BM1) corresponding to a boost preparatory phase or in a second operating mode (BM2) corresponding to a boost phase; wherein in the first operating mode (BM1) the electrical energy store (ES) is charged by operating the motor/generator unit (MGE), as a generator; and wherein in the second operating mode (BM2) a boost function of the electric machine (EA) is called by operating the motor/generator unit (MGE), together with the internal combustion engine (BKA), as a motor and by means of a device. Also disclosed herein is a device for controlling a drive train (A) of a hybrid vehicle (HEF), which can be driven by an internal combustion engine (BKA), respectively individually or together with an electric machine (EA), which comprises an electrical energy store (ES), power electronics (LE) and a motor/generator unit (MGE), having an operator control (BV), wherein, depending on a first or second position of the operator control (BV), the drive train (A) can be operated in a first operating mode (BM1) corresponding to a boost preparatory phase or in a second operating mode (BM2) corresponding to a boost phase; wherein in the first operating mode (BM1) the electrical energy store (ES) is charged by operating the motor/generator unit (MGE), as a generator; and wherein in the second operating mode (BM2) a boost function of the electric machine (EA) is called by operating the motor/generator unit (MGE), together with the internal combustion engine (BKA), as a motor.

Accordingly, in the method according to aspects of the invention, a first and a second operating mode for controlling a drive train of a hybrid vehicle are made available, which hybrid vehicle can be driven by an internal combustion engine, respectively individually or together with an electric machine, which comprises an electrical energy store, power electronics and a motor/generator unit, wherein, depending on a first or second position of an operator control, the drive train is operated in a first operating mode corresponding to a boost preparatory phase or in a second operating mode corresponding to a boost phase. In addition, in the method according to aspects of the invention, in the first operating mode the electrical energy store is charged by operating the motor/generator unit, as a generator, and in the second operating mode a boost function of the electric machine is called by operating the motor/generator unit, together with the internal combustion engine, as a motor.

In addition, in the present invention a device for controlling a drive train of a hybrid vehicle is made available, which hybrid vehicle can be driven by an internal combustion engine, respectively individually or together with an electric machine, which comprises an electrical energy store, power electronics and a motor/generator unit, having an operator control, wherein, depending on a first or second position of the operator control, the drive train can be operated in a first operating mode corresponding to a boost preparatory phase or in a second operating mode corresponding to a boost phase, wherein in the first operating mode the electrical energy store is charged by operating the motor/generator unit, as a generator, and wherein in the second operating mode a boost function of the electric machine is called by operating the motor/generator unit, together with the internal combustion engine, as a motor.

An idea on which the present invention is based is to permit brief overloading of the electric drive system in order to overtake another vehicle with the hybrid vehicle or to make available an increased drive power for a brief time. In this context it is important to use previously stored and available energy reserves in the electrical energy store.

According to one preferred embodiment of the method, in the first operating mode the electric machine is cooled, at least in certain areas, by an air conditioning device.

According to a further embodiment of the method, the power electronics and/or the motor/generator unit and/or the electrical energy store are cooled.

According to a further embodiment of the method, in the first operating mode the electric machine is cooled, at least in certain areas, to the lowest possible temperature values by an air conditioning device.

According to a further embodiment of the method of the present invention, the operator control comprises a pressure switch, in particular a pushbutton knob, wherein the first operating mode is called by pressing the operator control a first time, and wherein the second operating mode is called by pressing the operator control a further time.

According to a further embodiment of the method, after the ending of the boost function, the drive goes into a normal mode and the operator control goes into a waiting state for the first position.

According to a first embodiment of the device, in the first operating mode the electric machine can be cooled, at least in certain areas, by an air conditioning device.

According to a further embodiment of the device, the power electronics and/or the motor/generator unit and/or the electrical energy store can be cooled.

According to a further embodiment of the device, in the first operating mode the electric machine can be cooled, at least in certain areas, to the lowest possible temperature values by an air conditioning device.

According to a further embodiment of the device, the operator control comprises a pressure switch, in particular a pushbutton knob, wherein the first operating mode can be called by pressing the operator control a first time, and the second operating mode can be called by pressing the operator control a further time.

According to a further embodiment of the device, the device is configured in such a way that after the ending of the boost function, the drive goes into a normal mode and the operator control goes into a waiting state for the first position.

The above embodiments and developments of the invention can be combined with one another in any desired suitable fashion.

BRIEF DESCRIPTION OF THE DRAWING FIGURES

In the text which follows, embodiments of the present invention will be explained in more detail on the basis of exemplary embodiments and with reference to the appended figures of the drawings, in which.

DETAILED DESCRIPTION OF THE PREFERRED EMBODIMENTS

In all the figures, identical and functionally identical elements are provided with the same reference symbol, unless stated otherwise.

Figure 1:
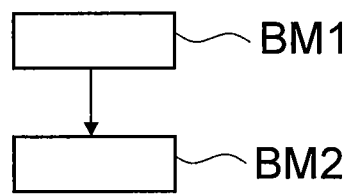
FIG. 1 shows a schematic illustration of a method for controlling a drive train of a hybrid vehicle according to a first embodiment of the present invention.

FIG. 1 shows a schematic illustration of a method for controlling a drive train of a hybrid vehicle according to a first embodiment of the present invention. A first operating mode BM1, which corresponds to a boost preparatory phase for preparing a subsequent boost phase, can be cooled by activating an operator control BV for the first time. For example, the operator control BV is embodied in the form of a pushbutton, a momentary contact switch, a pushbutton key with a latching function or in the form of a touchpad. In this context, for example a typical temperature predefinition for air conditioning the components of the electric machine EA is lowered. The temperature levels can also be set to optimum temperature ranges for the power values of the electric components. In addition, for example in the first operating mode BM1 an electrical energy store is fully charged to a maximum charge state of the electrical energy store by the motor/generator unit MGE. In the first operating mode BM1, for example the thermal storage capability of the individual components and elements of the electric machine EA is utilized to achieve an increased drive power of the electric machine EA in a subsequent second operating mode BM2. In this second operating mode BM2 corresponding to a boost phase of the hybrid vehicle HEF, for example an increased power capability of the components of the electric machine EA, such as, for example, of the motor/generator unit MGE, of the power electronics and/or of the electrical energy store, is utilized and these components are operated with an operating power which is excessively increased for a brief time and which is increased compared to an electric standard power level of the components in the normal state. For example, in this way a maximum power level of the electric machine EA is achieved in the boost phase, which maximum power level is used to drive the hybrid vehicle HEF.

Figure 2:
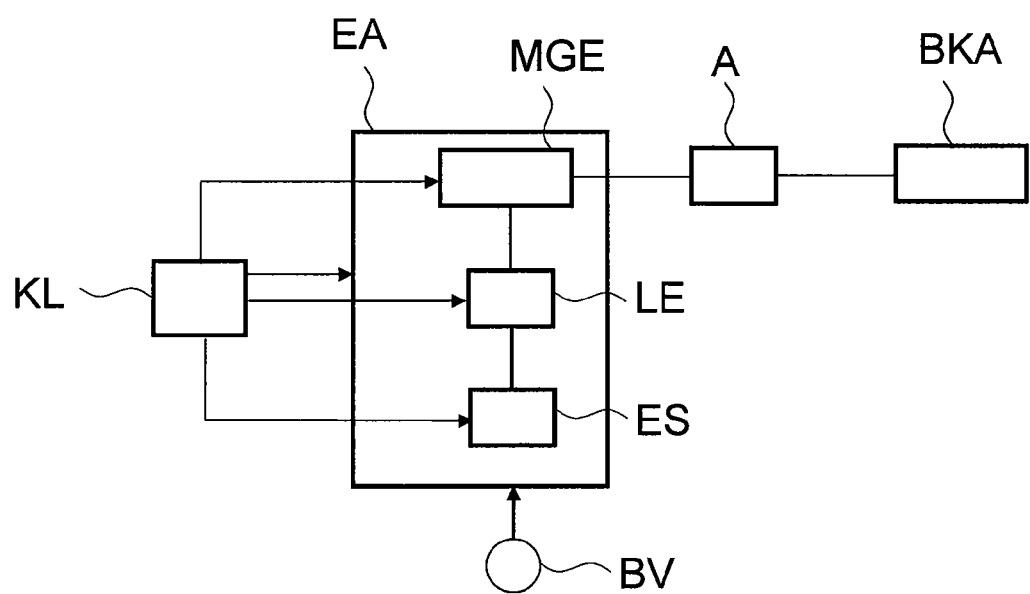
FIG. 2 shows a schematic illustration of a device for controlling a drive train of a hybrid vehicle according to a further embodiment of the present invention.

FIG. 2 shows a device for controlling a drive train of a hybrid vehicle according to a further embodiment of the present invention. The hybrid vehicle HEF is driven by an internal combustion engine BKA, respectively individually or together with an electric machine EA, wherein the internal combustion engine BKA and the electric machine EA are connected to the drive train A of the hybrid vehicle HEF. In addition, the electric machine EA comprises an electrical energy store ES, power electronics LE and a motor/generator unit MGE. For example, the electrical energy store ES is a lithium-ion accumulator with a certain operating temperature range. An air conditioning device KL is, for example, coupled thermally to individual components of the electric machine EA, wherein in particular the air conditioning device KL is coupled thermally to the motor/generator unit MGE, the power electronics LE and the electrical energy store ES. For example, the thermal coupling is carried out by fluid circuits or by connection to thermally conductive elements. The thermal connection allows the air conditioning device KL to regulate the temperature of the individual components of the electric machine. The operator control BV is connected to the electric machine EA and serves to call the first operating mode BM1 and the second operating mode BM2. In this context, the electrical energy store ES is connected to the power electronics LE in order to supply the power electronics LE with electrical energy, wherein the power electronics LE in turn supplies the motor/generator unit MGE.

Figure 3:
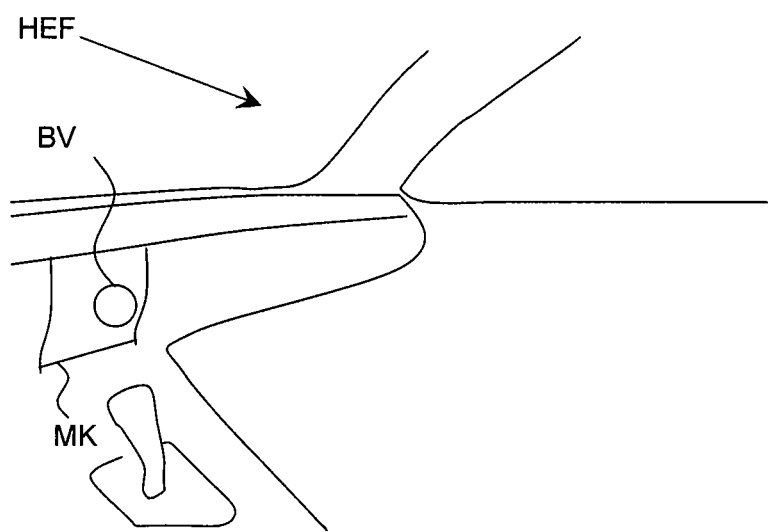
FIG. 3 shows a view of a passenger compartment of a hybrid vehicle, wherein an operator control for calling the operating modes of the hybrid vehicle can be called, according to a further embodiment of the present invention.

FIG. 3 shows a view of a passenger compartment of a hybrid electric vehicle HEF according to a further embodiment of the present invention. In a passenger compartment of the hybrid electric vehicle HEF, a center console MK is present, which has an operator control BV. A first operating mode BM1 corresponding to a boost preparatory phase can be called by activating the operator control BV. A second operating mode BM2 corresponding to a boost phase of the hybrid electric vehicle HEF is called by further activating the operator control BV. For example, a normal mode of the hybrid electric vehicle is also called by pressing the operator control BV again.

The invention claimed is:

1. A method for controlling a drive train of a hybrid vehicle, which can be driven by an internal combustion engine, respectively individually or together with an electric machine, which comprises an electrical energy store, power electronics and a motor/generator unit; wherein, depending on a first or second position of an operator control, the drive train is operated in a first operating mode corresponding to a high performance boost preparatory phase or in a second operating mode corresponding to a high performance boost phase; the method comprising the steps of:
activating the first operating mode, wherein, in the first operating mode, the internal combustion engine is operated, the electrical energy store is charged by operating the motor/generator unit as a generator, and the electric machine is cooled, at least in certain areas, by an air conditioning device to increase a thermal storage capacity of the electric machine in preparation for activation of the second operating mode; and
activating the second operating mode, wherein, in the second operating mode, a boost function of the electric machine is activated by operating the motor/generator unit of the cooled electric machine, together with the internal combustion engine, as a motor, to achieve a greater operating power during the high performance boost phase than during the high performance boost preparatory phase.

2. The method as claimed in claim 1, wherein the power electronics and/or the motor/generator unit and/or the electrical energy store are cooled.

3. The method as claimed in claim 1, wherein, in the first operating mode, the electric machine is cooled, at least in certain areas, to a lowest possible temperature value by the air conditioning device.

4. The method as claimed in claim 1, wherein the operator control comprises a pressure switch, and wherein the first operating mode is called by pressing the operator control a first time, and the second operating mode is called by pressing the operator control a further time.

5. The method as claimed in claim 4, wherein the pressure switch comprises a pushbutton knob.

6. The method as claimed in claim 1, wherein, after ending of the boost function, the drive train goes into a normal mode and the operator control goes into a waiting state for the first position.

7. The method as claimed in claim 1, wherein following the second operating mode, the drive train operates in a third normal operating mode, and wherein an available operating power of the electric machine is lower in the third operating mode than the available operating power of the electric machine in the second operating mode.

8. The method as claimed in claim 7 further comprising the step of activating the third normal operating mode using the operator control.

9. A device for controlling a drive train of a hybrid vehicle, which can be driven by an internal combustion engine, respectively individually or together with an electric machine, which comprises an electrical energy store, power electronics and a motor/generator unit, comprising:
an operator control, wherein, depending on a first or second position of the operator control, the drive train is configured to be operated in a first operating mode corresponding to a high performance boost preparatory phase or in a second operating mode corresponding to a high performance boost phase;
wherein, in the first operating mode, the internal combustion engine is operated, the electrical energy store is charged by operating the motor/generator unit, as a generator, and the electric machine is cooled, at least in certain areas, by an air conditioning device to increase a thermal storage capacity of the electric machine in preparation for activation of the second operating mode; and
wherein, in the second operating mode, a boost function of the electric machine is activated by operating the motor/generator unit of the cooled electric machine, together with the internal combustion engine, as a motor, to achieve a greater operating power during the high performance boost phase than during the high performance boost preparatory phase.

10. The device as claimed in claim 9, wherein the power electronics and/or the motor/generator unit and/or the electrical energy store are cooled.

11. The device as claimed in claim 9, wherein, in the first operating mode, the electric machine is cooled, at least in certain areas, to a lowest possible temperature value by the air conditioning device.

12. The device as claimed in claim 9, wherein the operator control comprises a pressure switch, and
wherein the first operating mode is configured to be activated by pressing the operator control a first time, and the second operating mode is configured to be activated by pressing the operator control a further time.

13. The device as claimed in claim 12, wherein the pressure switch comprises a pushbutton knob.

14. The device as claimed in claim 9, which is configured in such a way that after ending of the boost function, the drive train goes into a normal mode and the operator control goes into a waiting state for the first position.

15. The device as claimed in claim 9, wherein drive train is configured to be operated in a third normal operating mode, and wherein an available operating power of the electric machine is lower in the third operating mode than the available operating power of the electric machine in the second operating mode.

16. The device as claimed in claim 15, wherein the operator control is used to select the third normal operating mode.

* * * * *